(12) United States Patent
Richardson

(10) Patent No.: US 8,229,092 B2
(45) Date of Patent: Jul. 24, 2012

(54) FILTERING SPURIOUS VOICEMAIL MESSAGES

(75) Inventor: Eitan Richardson, Modi'in (IL)

(73) Assignee: AudioCodes Ltd., Lod (IL)

( * ) Notice: Subject to any disclaimer, the term of this patent is extended or adjusted under 35 U.S.C. 154(b) by 1598 days.

(21) Appl. No.: 11/421,753

(22) Filed: Jun. 1, 2006

(65) Prior Publication Data

US 2007/0280432 A1    Dec. 6, 2007

(51) Int. Cl.
H04M 1/64 (2006.01)
H04M 11/10 (2006.01)

(52) U.S. Cl. .................... 379/88.23; 455/413

(58) Field of Classification Search .......... 379/80, 379/88.01, 88.16, 88.18, 88.26, 406.03; 455/413
See application file for complete search history.

(56) References Cited

U.S. PATENT DOCUMENTS

| | | | | |
|---|---|---|---|---|
| 4,985,914 | A * | 1/1991 | Fukunaga | 379/88.27 |
| 5,917,891 | A * | 6/1999 | Will | 379/88.03 |
| 6,292,545 | B1 * | 9/2001 | Brablec et al. | 379/88.24 |
| 6,526,128 | B1 * | 2/2003 | Kermani | 379/88.22 |
| 7,558,381 | B1 * | 7/2009 | Ali et al. | 379/88.23 |
| 2002/0194002 | A1 * | 12/2002 | Petrushin | 704/270 |
| 2006/0227945 | A1 * | 10/2006 | Runge et al. | 379/88.05 |
| 2007/0041520 | A1 * | 2/2007 | Nagano | 379/88.13 |
| 2007/0133757 | A1 * | 6/2007 | Girouard et al. | 379/67.1 |

OTHER PUBLICATIONS

"Voice Activity Detection in Noisy Environments", Takeshi Yamada, Multimedia Laboratory, Institute of information Sciences and Electronics, University of Tsukuba, RWCP Sound Scene Database in Real Acoustical Environments; 1998-2001, Takeshi Yamada, University of Tsukuba. As printed from the Internet on Mar. 29, 2009, from: http://tosa.mri.co.jp/sounddb/nospeech/research/indexe.htm.
Speech and Language Processing: An introduction to Natural Language Processing, Computational Linguistics, and Speech Recognition, by Daniel Jurafsky and James H. Martin (Prentice-Hall, 2000, ISBN: 0-13-095069-6) Chapter 1—Introduction, As printed from the Internet on Mar. 29, 2009, from: http://www.cs.colorado.edu/~martin/SLP/Updates/1.pdf.

* cited by examiner

Primary Examiner — Md S Elahee
Assistant Examiner — Solomon Bezuayehu
(74) Attorney, Agent, or Firm — Eitan, Mehulal & Sadot

(57) ABSTRACT

A method is provided for discarding an audio message if the audio message meets a predefined discarding condition, which may factor in at least the audio message's total length, presence of spoken word(s) in the audio message, presence of tone(s) in the audio message and the presence of click(s) in the audio message. An audio message may be discarded if no spoken words are detected in it and the audio message's total length is shorter than a predefined minimal message length, or it contains a tone and the audio message's total length minus the tone's length is shorter than the predefined minimal message length, or it contains a click sound and the audio message's total length minus the click's length is shorter than the predefined minimal message length. An audio message may be first stored in a memory buffer and then moved to a legitimate messages pool memory or to a spurious messages pool memory. A messages discriminator and a voicemail system that utilize the messages discrimination method are also provided.

12 Claims, 2 Drawing Sheets

FILTERING SPURIOUS VOICEMAIL MESSAGES

FIELD OF THE DISCLOSURE

The present disclosure generally relates to the field of telephonic services. More specifically, the present disclosure relates to system, apparatus and method for filtering spurious voice-mail messages.

BACKGROUND

Voicemail (or voice mail; abbreviated v-mail or vmail) is usually a centralized system (but may be distributed) for managing telephone messages for a group of people. In its simplest form, a voicemail system mimics the functions of (and obsoletes) an answering machine, but uses one or more centralised server(s) rather than equipment at each individual telephone. Most voicemail systems are more sophisticated than answering machines, with the ability to forward messages to another voice mailbox, send messages to multiple voice mailboxes, add voice and/or other notes to a message, store messages for future delivery, make calls to a telephone or paging service when a message is received (for example as Short Message Service (SMS), Multimedia Messaging Service (MMS) or e-mail notification), transfer callers to another phone for personal assistance and play different message greetings to different callers. Voicemail messages are typically stored in a media used by computers to store other forms of data.

Many voicemail systems also offer an automated attendant facility, allowing callers answered by the system to dial a selected person's mail box or telephone. In telephony, an automated attendant system allows callers to be automatically transferred to a user's extension without the intervention of a receptionist. The automated attendant is a feature on most modern Private Branch eXchange (PBX) and key phone systems. A key phone system is a multiline telephone system typically used in small office environments.

Voicemail systems are found associated with many office telephone systems or PBX. They may also be associated with public telephone lines as network services. Mobile phones generally have voicemail as a standard network feature. Modern implementations of voicemail are or may include, for example, support fax and voicemail-to-text services, which transform each incoming voice message into text messaging for immediate delivery of a readable copy to SMS, MMS, alphanumeric pager, e-mail and so on.

Voicemail service has become a very popular telephonic service, which is rendered worldwide to millions of users of lined and wireless telephone sets. The voicemail service can either be provided locally, by the residential or enterprise voicemail system, or remotely—by the telephony or mobile service provider.

A typical voicemail system operates according to the following scheme, or according to a scheme similar to the following scheme—the calling party (the caller) dials the number of the called party. If the called party does not pick up the phone after several rings, the voicemail system plays a pre-recorded greeting message to the caller, for example "I am not available at the moment. Please leave a message". After playing the pre-recorded greeting message, the voicemail system typically generates and forwards to the caller an audio signal (usually in the form a short beep tone) as an indication that the voicemail system has switched into a recording mode of operation, which means that the voicemail system has started recording whatever can be picked up by the telephone's microphone, whether it is the caller's spoken words and/or maybe background noises originating from various sources. Sometimes, if the caller's voice is recorded without him/her leaving discernible spoken words (for example when the caller speaks to someone nearby while keeping the telephone handset away from his mouth), the caller's voice may also be regarded as a background noise. The caller may leave a message and hang up the phone, or he/she may hang up the phone without leaving a message.

If the pre-recorded greeting message was played to the caller (meaning that the called party did not respond to the call), the voicemail system (depending on its type) may generate and forward to the called party an indication that an unheard message is believed to have been recorded. Even if inarticulate or background noise recording was provided by a caller, voicemail systems forward the caller's message regardless of content (or lack of content) to a recipient. The recipient, or called party, usually receives notifications or indications that one or more messages have been recorded for him/her. Often, the indication is a short beep tone, or a series of such beeps and/or a switched on message-waiting lamp. These indications are sent to the called party regardless of whether the caller left a message that includes discernible spoken words or not.

The called party may later retrieve the message(s), for example by dialing a special number provided by the telephony or mobile service provider. Note that in cases where the voicemail service is provided by a service provider (which is often the case) the process of retrieving the message is both time and money consuming.

Although callers are often asked to leave a message in the called party's voicemail, many people, for various reasons and unless they have to, refrain from doing so. Since callers usually do not know in advance the number of rings preceding the playing of the pre-recorded greeting message, they tend to keep the telephone line open in vain while waiting for the called party to respond. If the called party does not respond for a certain, pre-configured, time period, the voicemail system automatically switches into a record mode of operation. Therefore, even though many callers do not intend to leave a message in a voicemail system, they often accidentally trigger the recordation of blank, or spurious, messages by traditional voicemail systems, which means that called parties, unable to distinguish between legitimate and blank, or spurious, message(s), will later have to equally handle both types of messages; that is, they will have to retrieve both types of messages and only then identify and distinguish between the two types of messages. Deleting a blank message is a time and money consuming process, in addition to it being annoying, because a called party wishing to delete a blank message has to interact with a (spoken-word or key or button or other driven) menu used by the voicemail system. Of course, the more there are blank messages recorded in a voicemail, the more time recipient or receiving party would have to spend in reviewing and deleting them. Since telephone calls are usually charged per time unit, the accumulating bill involved in deleting blank messages can sometimes be significant.

Some voicemail systems try to mitigate the problem of having to deal with blank messages by asking the caller, after his message is recorded, to depress a specified key that is associated with a certain code, symbol or character, for example '*', to acknowledge to the voicemail system that the caller does want to leave a message for the called party.

Voicemail systems of the types described above may reduce the number of blank messages. Such voicemail systems, however, fall short of meeting their avowed or intended goals because these types of voicemail systems require some degree of interaction with the telephone subscriber or user, usually the caller.

SUMMARY

The following embodiments and aspects thereof are described and illustrated in conjunction with systems, tools and methods, which are meant to be exemplary and illustrative, not limiting in scope. In various embodiments, one or more of the above-described problems have been reduced or eliminated, while other embodiments are directed to other advantageous or improvements.

As part of the present disclosure a messages discriminator (MD) is provided, which may be embedded in, or affiliated with, a voicemail system for discriminating blank recorded messages, which may include messages with background noise but not (audio) content, (referred to herein as a spurious messages) from legitimate messages. The term "blank recorded message" may also generally refer to a voicemail message, such as messages recorded or attempted to be recorded by a voicemail system, that does not (or does not appear to) contain spoken words discernible as by a software-based speech recognition tool. A voicemail or other recorded (or attempted) message that contains at least one discernible word is regarded herein as a legitimate message. A spurious message may contain background noises and/or one or more click noise(s) (a short electric inteference on the telephone line that is generated when the caller hangs up the phone). If the voicemail system fails to timely recognize the disconnection (termination) of the call session by the caller, a "ring", "busy" or other generated tone may also be recorded by the voicemail system together with the spurious, or legitimate, message, whichever the case may be.

According to some embodiments the MD may include a controller that is adapted to recognize and/or discard an audio message if the audio message meets a predefined discarding condition. The MD may further include a legitimate messages pool memory ("LMP") and the controller may be further adapted to store an audio message in the LMP if the audio message is not discarded.

According to some embodiments of the present disclosure the MD may further include an audio message buffer ("MBF") memory. The MD may temporarily store an incoming (newly recorded) message in the MBF memory and employ the predefined discarding condition to determine whether the audio message stored in the MBF memory is a legitimate message or a spurious message. If the messages discriminator (MD) determines that the audio message stored in the MBF memory is a legitimate message, the MD may move the legitimate message from the MBF memory to the LMP memory. "Move" may involve copying the message from the MBF memory to the intended destination (in this case the LMP memory) and, thereafter, deleting the message from the MBF memory and/or associating a flag or note with the message to designate it as an expectedly legitimate message. If, however, the MD determins that the audio message stored in the MBF is spurious, the MD may delete the spurious message from the MBF memory and/or associate a flag or note with the expectedly spurious message to designate that it should not be delivered, and/or may be erased and/or that the memory space used may be re-designated or re-used. Alternatively, the MD may further include a spurious messages pool ("SMP") memory, and the controller may be further adapted to move the expectedly spurious audio message from the MBF memory to the SMP memory. According to some embodiments spurious messages may be stored in a subsection of the LMP memory.

According to some embodiments, if spurious messages are deleted immediately upon detection (without being copied to, or stored in, a SMP memory), a telephone subscriber or user associated with stored legitimate message(s) may access the legitimate messages stored in the LMP memory in a normal manner (dialing a code and withdrawing legitimate messages). According to some other embodiments, if spurious messages are stored in a SMP memory, a telephone subscriber or user may use differing distinct access codes to access both, either, or a combination of legitimate messages stored in the LMP memory and spurious messages stored in the SMP memory.

As part of the present disclosure the messages discriminator (MD) disclosed herein may discriminate spurious messages from legitimate messages by utilizing weighted, threshold or other factoring, as part of or associated with the predefined discarding condition, several criterions, such as: (1) The time-wise length of the recorded message, the nature of which (spurious or legitimate) is unknown at the time it is recorded by the voicemail system, (2) Actual voice (speech) characteristics contained in the recorded message (if spoken words were recorded), (3) Tone(s) (for example a "busy" tone) that may be contained within the recorded message, and (4) Click(s), which may be an electrical interference caused as a result of a telephone connection being terminated.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. It is intended that the embodiments and figures disclosed herein be considered illustrative, rather than restrictive. The disclosure, however, both as to organization and method of operation, together with objects, features, and advantages thereof, may best be understood by reference to the following detailed description when read with the accompanying figures, in which.

Figure 1:
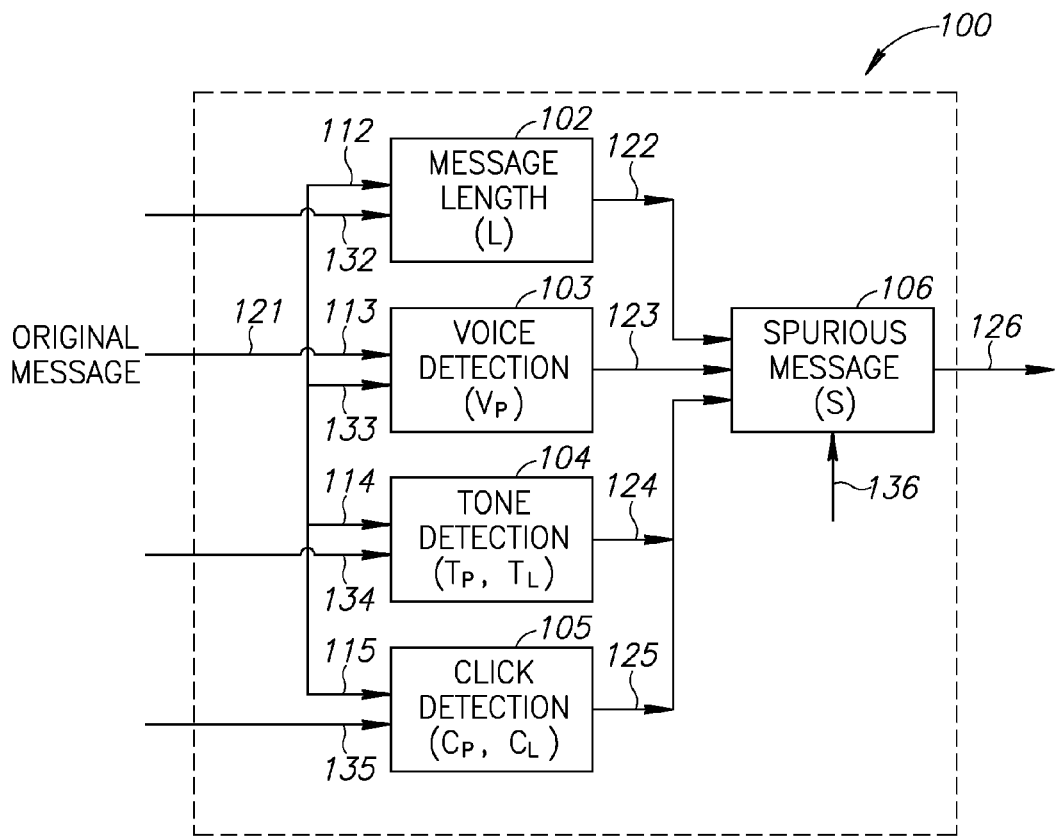
FIG. 1 schematically illustrates, by way of an example, a messages discrimination method to be used by a messages discriminator according to some embodiments of the present disclosure.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the disclosure. However, it will be understood by those skilled in the art that the present disclosure may be practiced without these specific details. In other instances, well-known methods, procedures, components and circuits have not been described in detail so as not to obscure the present disclosure.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

The present disclosure may take the form of an entirely hardware embodiment, an entirely software embodiment or an embodiment containing both hardware and software elements. In a preferred embodiment, the disclosure is implemented in software, which includes but is not limited to firmware, resident software, microcode, and so on.

Embodiments of the present disclosure may include apparatuses for performing the operations described herein. This apparatus may be specially constructed for the desired purposes, or it may comprise a general purpose computer selectively activated or reconfigured by a computer program stored in the computer.

Furthermore, the disclosure may take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements may include local memory employed during actual execution of the program code, bulk storage, and cache memories which provide temporary storage of at least some program code in order to reduce the number of times code has to be retrieved from bulk storage during execution. Input/output or I/O devices (including but not limited to keyboards, displays, pointing devices, and so on) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The processes presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present disclosure are not described with reference to any particular programming language. It will be appreciated that a variety of programming languages may be used to implement the teachings of the disclosures as described herein.

As part of the present disclosure the messages discriminator (MD) disclosed herein may discriminate spurious messages from legitimate messages by using several criterions, as is described in connection with FIG. 1.

Referring now to FIG. 1, a block diagram of a messages discrimination process or method (generally shown at 100) is shown, which may be used by a messages discriminator in accordance with some embodiments of the present disclosure. Original (audio) Message 101 may be a recorded (in a voicemail system) message the nature of which (spurious or legitimate) is unknown and, therefore, Original Message 101 is forwarded (shown at 121) to process 100 for descrimination. The descrimination may occur "real-time" as the message is being recorded or transferred, or may occur after the message or portion of the message has been recorded. Process 100 may include one or more of four decision making modules: Message Length 102, Voice Detection 103, Tone Detection 104 and Click Detection 105. Original Message 101 may be forwarded serially (not shown) or simultaneously (shown as all four in parallel, but two or more may be in parallel, others may be serially before or after, or one or more decision making modules may not be used) to one or more of the four decision making modules 102, 103, 105 and 105 (shown at 112, 113, 114 and 115, respectively) for shortening (relative to cascading decision making units) the time length involved in deciding whether a recorded message (Original Message 101) is spurious or legitimate. A memory unit (not shown), or a memory space within a memory unit which may be associated with a given subscriber group or service, may include a messages pool that may include one or more recorded messages, such as Original Message 101 and, optionally, metadata related to the recorded messages. Some, or none or all of the messages in that messages pool may be spurious.

Message Length 102 may employ digital signal processing (DSP) tool(s) to measure, or calculate, and output (shown at 122) the total time length L (in seconds) of the message, including spoken words (if there are any) and pauses therebetween, tones (if there are any) and background noise. Message Length 102 may receive (shown at 132) control signal(s) for controlling its operation, for example for enabling and disabling Message Length 102.

Voice Detection 103 may employ speech detection or recognition algorithm(s) to decide whether the recorded message (original message 101, for example) includes pattern(s) that is/are unique to, associated with or represent spoken word(s). Voice Detection 103 may output (shown at 123) a "word(s) detected" indication (in which case a variable, $V_P$, is assigned a logical value "True", or "1") or a "word(s) not detected" indication (in which case $V_P$ is assigned logical value "False", or "0"). If Voice Detection 103 decides that one or more words have been detected in the recorded message, then Voice Detection 103 may also output (shown at 123) the period of each detected word and/or the speech total time length ($V_L$). The speech total time length may be expressed in various ways, such as: (1) as the difference between the time instant at which the first word was detected and the time instant at which the last word was detected, including pauses between words, and (2) as a sum of the time length of the detected words. Voice Detection 103 may receive (shown at 133) control signal(s) for controlling its operation, for example for enabling and disabling Voice Detection 103.

Tone Detection 104 may employ a DSP tool to detect the presence of a tone signal. "Tone signal" may include a one-frequency or other known form of signal superimposed on the recorded message, whether spurious or not. Tones may be generated as by the calling telephone set, such as when the caller responds to an interaction voice response (IVR) system or by the voicemail system itself. Tones may also be generated by the caller's telephony switch or PBX, such as when the caller hangs up the phone and for some reason the voicemail system did not timely detect it, in which cases a fast busy tone will be recorded by the voicemail system. Tone signal(s) may also originate elsewhere as a background noise. Tone Detection 104 may output (shown at 124) a "tone presence" indication (in which case a variable, $T_P$, is assigned a logical value "True", or "1") or a "tone absence" indication (in which case $T_P$ is assigned a logical value "False", or "0"). If Tone Detection 104 decides that a tone is present in the checked message (in Original Message 101, for example), Tone Detection 104 may also output (shown at 124) the tone's total time length ($T_L$). Tone Detection 104 may receive (shown at 134) control signal(s) for controlling its operation, for example for enabling and disabling Tone Detection 104.

Click Detection 105 may employ a digital signal processing (DSP) tool to detect the presence of a click, or the like (such as the sound generated from an electric interference when a calling party hangs up the phone). Click Detection 105 may output (shown at 125) "click present" indication (in which case a variable, $C_P$, is assigned a logical value "True", or "1") or "click absent" indication (in which case $C_P$ is assigned logical value "False", or "0") and, optionally, the click's time length ($C_L$). Click Detection 105 may receive (shown at 135) control signal(s) for controlling its operation, for example for enabling and disabling Click Detection 105.

Voice Detection 103, Tone Detection 104 and Click Detection 105 may utilize substantially any existing voice detection algorithm(s) to detect spoken words and tones in a recorded message (including a message being recorded in real-time), for example in association with an algorithm called voice activity detection (VAD), which is an algorithm used in speech processing for determining the presence or absence of human speech in a given audio signal. Further description of VAD may be found, for example at "Voice Activity Detection in Noisy Environments" (Takeshi Yamada, Multimedia Laboratory, Institute of Information Sciences and Electronics, University of Tsukuba, RWCP Sound Scene Database in Real Acoustical Environments Copyright © 1998-2001 Takeshi Yamada, University of Tsukuba), herein incorporated by reference. The main uses of VAD are in speech coding and speech recognition. A VAD may not just indicate the presence or absence of speech, but also whether the speech is voiced or unvoiced (computer generated speech, for example), sustained or early, and so on. Speech recognition technologies allow computers equipped with a source of sound input, such as a microphone, to interpret human speech, for example, for transcription or as an alternative method of interacting with a computer. Speech recognition algorithms are also utilized by various Speech-to-Text applications. More complete description(s) related to speech processing may be found, for example, in "SPEECH and LANGUAGE PROCESSING: An Introduction to Natural Language Processing, Computational Linguistics, and Speech Recognition", by Daniel Jurafsky and James H. Martin (Prentice-Hall, 2000, ISBN: 0-13-095069-6), herein incorporated by reference.

Spurious Message 106 may utilize any combination of the indications forwarded (shown at 122 through 125) to it, to predefine a discarding condition whereby one or more conditions may be used to decide whether Original Message 101 is spurious, and accordingly output (shown at 126) a logical value "True" (S=1, Original Message 101 is spurious) or a logical value "False" (S=0, Original Message 101 is not spurious). For example, a checked message (Original Message 101, for example) may be considered a spurious message (S=1) if no spoken word(s) were detected ($V_P$=0) in the checked message; with a greater accuracy if additionally at least one of the following three conditions is met:

1. $L<(L_{Min})$=True, which means that the time-wise length of the checked message is shorter than a predtermined threshold value ($L_{Min}$);
2. $T_P$=True and $(L-T_L)<L_{Min}$=True, which means that tone(s) was/were detected in the checked message and the net time remaining for a potential short non-spurious message (a message containing at least one discernible word), which is the difference ($L-T_L$), is too short ($<L_{Min}$); and
3. $C_P$=True and $(L-C_L)<L_{Min}$=True, which means that click(s) was/were detected in the checked (recorded) message and the net time remaining for a potential non-spurious message, which is the difference ($L-C_L$), is too short ($<L_{Min}$).

The above-described conditions are summarized in expression (1), which designates an exemplary discarding condition:

$$S=(\text{not } V_P) \text{ and } \{(L<L_{Min}) \text{ or } [T_P \text{ and } (L-T_L)<L_{Min}] \text{ or } [C_P \text{ and } (L-C_L)<L_{Min}]\} \quad (1)$$

where S may have one of two logical states, "True" (the checked message is spurious) and "False" (the checked message is non-spurious, or legitimate), $L_{Min}$ is a minimal time length (for example 2 seconds) expected for a very short voicemail message containing at least one discernible word. Spurious Message 106 may receive (shown at 136) control signal(s) for controlling its operation, for example for enabling and disabling Spurious Message 106. Explicitly contemplated may be the use of any one or two or three of the shown or additional/other conditions to facilitate a discarding condition. As noted previously, one or more conditions may be initially considered, and one or more further conditions may be considered if the first condition(s) have preselected results.

Figure 2:
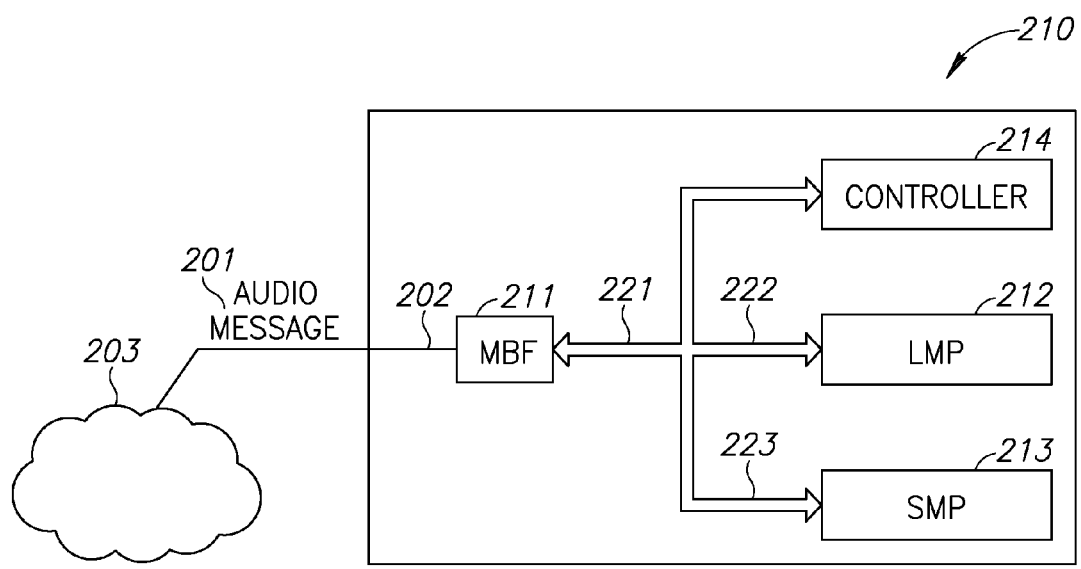
FIG. 2 schematically illustrates an exemplary messages discriminator utilizing the messages discrimination method of FIG. 1.

Referring now to FIG. 2, a message discriminator (MD) (generally shown at 210) is shown which utilizes the discrimination method or process shown in FIG. 1. Message discriminator 210 may include memory buffer (MBF) 211 for temporarily storing an incoming audio message, legitimate messages pool (LMP) memory 212 for storing legitimate messages, spurious messages pool (SMP) memory 213 for storing spurious messages and controller 214 for employing process 100 of FIG. 1 on recorded messages such as Audio Message 201, and may have further function(s) for controlling, among other things, the messages flow to/from MBF 211 (shown at 221), to/from LMP 212 (shown at 222) and to/from SMP 213 (shown at 223).

Audio Message 201 may be forwarded (shown at 202) from any wired, wireless or other telephonically oriented communication system (generally shown at 203) to messages discriminator 210. Audio Message 201 may be temporarily recorded and stored in MBF 211. Controller 214 may then employ method 100 of FIG. 1 to determine whether Audio Message 201 (as recorded and stored in MBF 211) is legitimate or spurious. Controller 214 may be adapted to discard Audio Message 201 if Audio Message 201 meets a predefined discarding condition. Controller 214 may be also adapted to store Audio Message 201 in LMP memory 212 if, according to the predefined discarding condition, Audio Message 201 is not to be discarded (for being a legitimate message).

If, however, Controller 214 determines that Audio Message 201 is, according to the predefined discarding condition, a spurious message and no spurious messages pool (such as SMP 213) exists, controller 214 may cause Audio Message 201 to be deleted from MBF memory 211. Alternatively, if controller 214 determines that Audio Message 201 is a spurious message and messages discriminator 210 includes also a spuriouos messages pool such as SMP 213, Controller 214 may cause Audio Message 201 to be moved from MBF memory 211 to SMP memory 213. According to some embodiments spurious message(s) may be stored in a subsection (shown at 232) of LMP memory 212.

According to some embodiments, if spurious message(s) are not stored in a spurious memory pool memory such as SMP 213, or in a sub-section of a legitimate messages pool memory such as sub-section 232, but, rather, they are deleted immediately upon detection, a telephone subscriber associated with the stored legitimate message(s) may normally access the legitimate message(s) stored in the LMP memory. That is, the telephone subscriber may dial, use or trigger a special access code to access message(s) stored in LMP 212 memory and respond to IVR instruction(s) for further storing message(s) or deleting message(s). According to some embodiments, if spurious message(s) is/are stored in SMP memory 213, the telephone subscriber may independently access the legitimate message(s) stored in LMP memory 212 and the spurious message(s) stored in SMP memory 213 (or in memory sub-section 232, depending on the application used) by using two or more different access codes: one code for accessing messsages in LMP 212 and another code for accessing messsage(s) in SMP 213.

Figure 3:
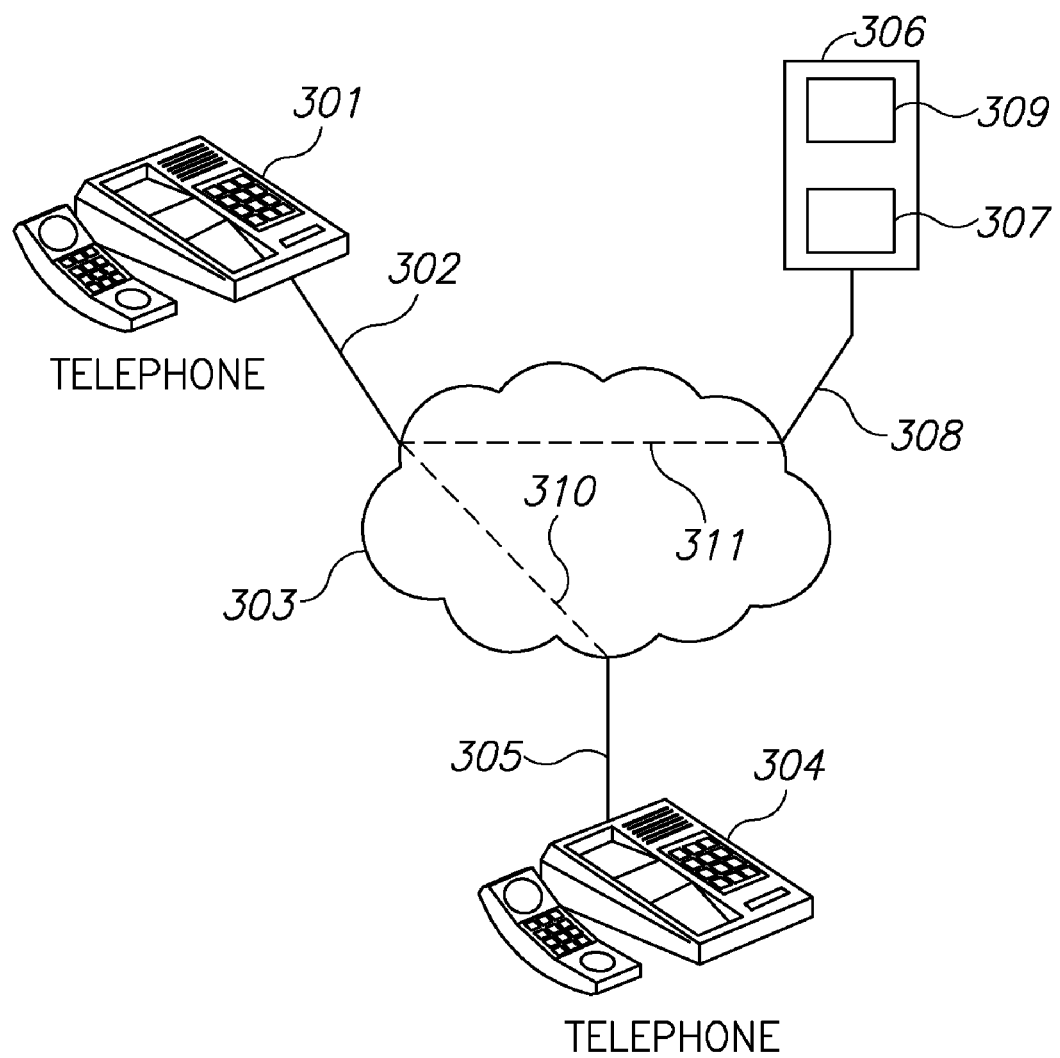
FIG. 3 schematically illustrates an exemplary voicemail system using the messages discriminator of FIG. 2.

Referring now to FIG. 3, an exemplary telephone system wherein a message(s) discriminator (such as MD 210 of FIG. 2) is embedded in a voicemail system is schematically illustrated. Telephone device 301 is shown functionally coupled (shown at 302) to telephone system 303. Telephone device 304 is also shown functionally coupled (shown at 305) to telephone system 303. Message discriminator (MD) 307, which may operate in a similar manner as MD 210 of FIG. 2, is shown in FIG. 3 embedded in voicemail system 306, which may be functionally coupled (shown at 308) to telephone system 303. Voicemail system 306 may allocate, per telephone subscriber, a message(s) memory space: a legitimate message(s) pool memory (such as LMP memory 212 of FIG. 2) and (depending on the application used) a spurious message(s) pool memory (such as SMP memory 213 of FIG. 2). For example, voicemail system 306 may allocate a message(s) memory space (shown at 309) for storing legitimate (and, depending on the application used, also spurious) message(s) for the subscriber associated, for example, with telephone device 304.

A first telephone subscriber may use telephone device 301 to call a second telephone subscriber associated with telephone device 304 for establishing a communication path therebetween (shown at 310). The first telephone subscriber may call the second telephone subscriber over a wired telephone network (for example a PSTN network), a cellular telephone network, or partly over a wired telephone network and partly over a wireless telephone network, or any other telephone network, all of which are generally designated herein, for the sake of simplicity, as telephone system 303.

Assuming that a communication path is established (shown at 310) between telephone devices 301 and 304, and telephone device 304 rings but the second telephone subscriber does not timely respond to the ringing telephone device 304 and a voicemail service is rendered by voicemail system 306 to the subscriber associated with telephone device 304, the telephone call may (after a predefined number of rings) be redirected (shown at 311) to voicemail system 306. The caller using telephone device 301 may then leave a message and hang up telephone 301, or he/she may hang up telephone 301 without leaving a message. However, as is explained earlier, if the caller does not want to leave a message but s/he fails to timely terminate the call session, voicemail system 306 assumes that the caller wants to leave a message and, therefore, voicemail system 306 automatically enters into a record mode of operation. In such a case, a spurious message may be forwarded via communication path 311, and recorded in a common (or in an allocated) MBF memory (such as MBF 211 of FIG. 2) in MD 307. The recording duration may be substantially from the instant at which the recording begun until the caller terminates the call or the predefined recording duration elapses, whichever occurs first.

Once a (legitimate or spurious) message is recorded, substantially any type of unheard message signaling technique may be used by voicemail system 306 to forward to telephone device 304 to indicate to its subscriber, or user, that at least one unheard message is stored in the voicemail system 306. For example, the signal may be a lamp switched on and/or off, or periodically switched on and off, on telephone device 304. According to another example, the signal may be a tone beep which the subscriber or user associated with telephone device 304 may hear upon entering into a call mode of operation, such as by lifting the telephone's handset or switching on the telephone device (depending on the telephone's type).

According to some embodiments voicemail system 306 may forward to telephone device 304 a first signal associated with an unheard legitimate message(s), and a second, distinct, signal associated with an unheard spurious message(s) (provided, of course, that spurious messages can be stored in a spurious messages pool memory such as SMP memory 213 of FIG. 2).

A messages discriminator such as MD 210 of FIG. 2 may be easily affiliated with, embedded or incorpoated substantially into any existing voicemail system and into voicemail systems that may be devised in the future. In addition, as will be appreciated by a person of skill in the art, the message(s) discriminator disclosed herein is agnostic to the type of voicemail system, as it is (or may be easily adapted to be) applicable both to legacy voicemail systems and to modern packet-based voice over Internet Protocol ("VoIP") voicemail systems. The messages discriminator is also agnostic to the location of the voicemail service rendering party or system.

While certain features of the disclosure have been illustrated and described herein, many modifications, substitutions, changes, and equivalents will now occur to those skilled in the art. It is, therefore, to be understood that the appended claims are intended to cover all such modifications and changes as fall within the true spirit of the disclosure.

What is claimed:

1. A messages discriminator, comprising:
 a controller to determine whether or not an audio message meets a predefined discarding condition;
 a legitimate messages pool memory, and
 a non-legitimate messages pool memory,
 wherein, if the controller determines that the audio message meets the predefined discarding condition, then the controller is to assign a first binary value to a binary flag associated with said audio message to indicate that the audio message is non-legitimate;
 wherein, if the controller determines that the audio message does not meet the predefined discarding condition, then the controller is to assign a second binary value to the binary flag associated with said audio message to indicate that the audio message is legitimate;
 wherein said predefined discarding condition is defined to be met if no spoken words are detected in said audio message and at least one of the following conditions is met:
 a total length of the audio message is shorter than a predefined minimal message length, or said audio message contains a tone, and the total length of the audio message minus a length of the tone is shorter than said predefined minimal message length, or said audio message contains a click sound, and the total length of the audio message minus a length of the click sound is shorter than said predefined minimal message length;

wherein the controller is to discriminate among legitimate and non-legitimate audio messages exclusively based on their original non-translated version as recorded, and without taking into account any translation of said audio messages;

wherein the controller is to determine whether the audio message is either legitimate or non-legitimate based exclusively on an analysis of audio content of the audio message, independently of an identity of a sender of the audio message, independently of audio data of one or more other received audio messages, and without relying on preset information indicated by a recipient of the audio message;

wherein said controller is to store said audio message in said legitimate messages pool memory if said binary flag contains said second binary value wherein said controller is to store said audio message in said non-legitimate messages pool memory if said binary flag contains said first binary value, wherein the non-legitimate messages pool memory is to store non-legitimate messages, which are discarded by said controller autonomously without user intervention and are not-yet-deleted by a user.

2. The messages discriminator according to claim 1, wherein the predefined discarding condition takes into account at least:
a total length of the audio message;
presence of one or more spoken words in said audio message;
presence of one or more tones in said audio message; and
presence of one or more clicks in said audio message.

3. The messages discriminator according to claim 1, wherein the controller is to render accessible to a user both messages stored in the legitimate messages pool memory and messages stored in the non-legitimate messages pool memory, by using two distinct access codes.

4. The messages discriminator according to claim 1, further comprising:
a buffer memory for storing an incoming audio message,
wherein the controller is to move said audio message from said buffer memory to the legitimate messages pool memory or to the non-legitimate messages pool memory, based on a determination whether or not the incoming audio message meets the predefined discarding condition.

5. A voicemail system, comprising:
a messages discriminator to selectively discard one or more audio messages,
the message discriminator comprising:
a controller to determine whether or not an audio message meets a predefined discarding condition;
a legitimate messages pool memory, and
a non-legitimate messages pool memory,
wherein, if the controller determines that the audio message meets the predefined discarding condition, then the controller is to assign a first binary value to a binary flag associated with said audio message to indicate that the audio message is non-legitimate;
wherein, if the controller determines that the audio message does not meet the predefined discarding condition, then the controller is to assign a second binary value to the binary flag associated with said audio message to indicate that the audio message is legitimate;

wherein said predefined discarding condition is defined to be met if no spoken words are detected in said audio message and at least one of the following conditions is met:
a total length of the audio message is shorter than a predefined minimal message length, or said audio message contains a tone, and the total length of the audio message minus a length of the tone is shorter than said predefined minimal message length, or said audio message contains a click sound, and the total length of the audio message minus a length of the click sound is shorter than said predefined minimal message length;

wherein the controller is to discriminate among legitimate and non-legitimate audio messages exclusively based on their original non-translated version as recorded, and without taking into account any translation of said audio messages;

wherein the controller is to determine whether the audio message is either legitimate or non-legitimate based exclusively on an analysis of audio content of the audio message, independently of an identity of a sender of the audio message, independently of audio data of one or more other received audio messages, and without relying on preset information indicated by a recipient of the audio message;

wherein said controller is to store said audio message in said legitimate messages pool memory if said binary flag contains said second binary value wherein said controller is to store said audio message in said non-legitimate messages pool memory is said binary flag contains said first binary value, wherein the non-legitimate messages pool memory is to store non-legitimate messages, which are discarded by said controller autonomously without user intervention and are not-yet-deleted by a user.

6. The voicemail system according to claim 5, wherein the predefined discarding condition takes into account at least:
a total length of the audio message;
presence of one or more spoken words in said audio message;
presence of one or more tones in said audio message; and
presence of one or more clicks in said audio message.

7. The voicemail system according to claim 5, wherein the controller is to render accessible to a user both messages stored in the legitimate messages pool memory and messages stored in the non-legitimate messages pool memory, by using two distinct access codes.

8. The voicemail system according to claim 5, further comprising:
a buffer memory for storing an incoming audio message,
wherein the controller is to move said audio message from said buffer memory to the legitimate messages pool memory or to the non-legitimate messages pool memory, based on a determination whether or not the incoming audio message meets the predefined discarding condition.

9. A method of handling audio messages, the method comprising:
determining whether or not an audio message meets a predefined discarding condition;
if said audio message does not meet the predefined discarding condition, storing said audio message in a legitimate messages pool memory;

if said audio message meets said predefined discarding condition, storing said audio message in a non-legitimate messages pool memory, wherein, if it is determined that the audio message meets the predefined discarding condition, then the method comprises assigning a first binary value to a binary flag associated with said audio message to indicate that the audio message is non-legitimate;

wherein, if it is determined that the audio message does not meet the predefined discarding condition, then the method comprises assigning a second binary value to the binary flag associated with said audio message to indicate that the audio message is legitimate;

wherein said predefined discarding condition is defined to be met if no spoken words are detected in said audio message and at least one of the following conditions is met:

a total length of the audio message is shorter than a predefined minimal message length, or said audio message contains a tone, and the total length of the audio message minus a length of the tone is shorter than said predefined minimal message length, or said audio message contains a click sound, and the total length of the audio message minus a length of the click sound is shorter than said predefined minimal message length;

wherein the method comprises discriminating among legitimate and non-legitimate audio messages exclusively based on their original non-translated version as recorded, and without taking into account any translation of said audio messages;

wherein the method comprises determining whether the audio message is either legitimate or non-legitimate based exclusively on an analysis of audio content of the audio message, independently of an identity of a sender of the audio message, independently of audio data of one or more other received audio messages, and without relying on preset information indicated by a recipient of the audio message;

wherein the method comprises storing said audio message in said legitimate messages pool memory if said binary flag contains said second binary value;

wherein the method comprises storing said audio message in said non-legitimate messages pool memory if said binary flag contains said first binary value;

wherein storing the audio message in the non-legitimate messages pool memory comprises storing an audio message which is autonomously discarded by a controller without user intervention and is not-yet-deleted by a user, wherein the method is to be performed by a voice messaging system comprising said controller.

10. The method according to claim 9, wherein the predefined discarding condition takes into account at least:

a total length of the audio message;

presence of one or more spoken words in said audio message;

presence of one or more tones in said audio message; and presence of one or more clicks in said audio message.

11. The method according to claim 9, comprising:

rendering accessible to a user messages stored in the legitimate messages pool memory and messages stored in the non-legitimate messages pool memory, using two distinct access codes.

12. The method according to 9, comprising:

storing the audio message in a memory buffer; and moving the audio message to the legitimate messages pool memory or to the non-legitimate messages pool memory, based on a determination whether or not the audio message meets the predefined discarding condition.

* * * * *